United States Patent

Kashiwabara et al.

Patent Number: 5,119,782
Date of Patent: Jun. 9, 1992

[54] IGNITION TIMING CONTROL SYSTEM FOR INTERNAL COMBUSTION ENGINE

[75] Inventors: Shigeto Kashiwabara; Hiroshi Kawaguchi, both of Wako, Japan

[73] Assignee: Honda Giken Kogyo Kabushiki Kaisha, Tokyo, Japan

[21] Appl. No.: 738,026

[22] Filed: Jul. 30, 1991

[30] Foreign Application Priority Data

Aug. 24, 1990 [JP] Japan ................................ 2-224092

[51] Int. Cl.$^5$ .............................................. F02P 5/15
[52] U.S. Cl. .................................................. 123/422
[58] Field of Search ................ 123/418, 422, 423, 425

[56] References Cited

U.S. PATENT DOCUMENTS

| | | | |
|---|---|---|---|
| 4,448,163 | 5/1984 | Yoshida | 123/422 |
| 4,887,573 | 12/1989 | Fujiwara et al. | 123/422 |
| 4,909,224 | 3/1990 | Nishiyama et al. | 123/422 X |
| 4,915,076 | 4/1990 | Takizawa | 123/422 X |
| 4,924,832 | 5/1990 | Abe | 123/422 X |
| 4,987,874 | 1/1991 | Katayama et al. | 123/422 |

FOREIGN PATENT DOCUMENTS 2191539  12/1987  United Kingdom ................. 123/422
2208410A  3/1989  United Kingdom .

Primary Examiner—Willis R. Wolfe
Attorney, Agent, or Firm—Armstrong, Nikaido, Marmelstein, Kubovcik & Murray

[57] ABSTRACT

An ignition timing control system for vehicle internal combustion engines which retards the ignition timing during acceleration so as to reduce power shock caused by drive shaft vibration generated when the body of a vehicle with a high-powered engine is not able to keep up with the sudden change in engine output torque and so as to avoid the combustion knock that is apt occur during acceleration. In order to compensate for the monifold pressure lag when an acceleration state is detected, the engine load is monitored as to whether it reaches a reference level within prescribed a period, and only after it is confirmed that the engine output torque has actually begun to increase within the prescribed period, the ignition timing retard is commenced. The retarded ignition timing is maintained for another period when the engine load is above a second reference level and then returned in the advance direction at a first slow rate. On the other hand, if the engine load is below the second reference level, the retarded ignition timing is immediately advanced at a second rate which is greater than the first rate.

10 Claims, 4 Drawing Sheets

IGNITION TIMING CONTROL SYSTEM FOR INTERNAL COMBUSTION ENGINE

BACKGROUND OF THE INVENTION

1. Field of the Invention

This invention relates to an ignition timing control system for internal combustion engines, more particularly to an ignition timing system for vehicle internal combustion engines that retards the ignition timing during acceleration so as to reduce power shock and avoid the combustion knock that is apt to occur during acceleration.

2. Description of the Prior Art

The increase in engine speed and load that occurs during acceleration of a vehicle internal combustion engine causes the knock zone to shift in the direction of retarded ignition timing, thus increasing the probability of knock occurrence. It has therefore been proposed to prevent the occurrence of knocking during acceleration by employing a technique of ignition timing control for the internal combustion engine which retards the ignition timing during acceleration. For example, Japanese Laid-open Patent Publication No. 57(1982)-99269 proposes a technique of this type which detects engine acceleration from the degree of throttle opening and in response to this detection retards the ignition timing by a prescribed amount so as to avoid the occurrence of knock.

In this prior art system, the adjustment for retarding the ignition timing is carried out directly or immediately after it is detected through the degree of throttle opening that the engine is accelerating. Actually, at the initial stage of acceleration, however, the engine's air intake system experiences a response lag between the change in the throttle pedal depression and the change in the engine load so that the engine output torque does not increase immediately. As a result, the retarding of the ignition timing causes an unnecessary decline in the engine output at the early stage of acceleration. This lowers the feeling of acceleration perceived by the operator and degrades the control response.

In the case of a vehicle equipped with a high-power engine, on the other hand, since the vehicle body is not able to keep up with the sudden change in engine output torque during acceleration, there arises a torque phase lag which is apt to cause vibration of the drive system for conveying the engine output to the drive wheels. This vibration is particularly apt to be manifested as swaying oscillation of the drive shaft. This phenomenon, referred to as power shock, not only degrades the acceleration "feel" but is also undesirable from the point of drivability.

SUMMARY OF THE INVENTION

In view of the above, an object of the present invention is to provide an ignition timing control system for vehicle internal combustion engines for overcoming the aforesaid drawbacks of the conventional system.

Another object of the present invention is to provide an ignition timing control system for vehicle internal combustion engines which prevents the occurrence of knock during acceleration without degrading control response, and simultaneously reduces power shock.

This invention achieves this object by providing a system for controlling ignition timing of a vehicle internal combustion engine including first means for detecting engine speed and engine load, second means for detecting an acceleration state of the engine, control means for determining a basic ignition timing of the engine based on the detected engine speed and engine load and adjusting the basic ignition timing in the retard direction when the acceleration state is detected, and ignition means for igniting an air-fuel mixture in a combustion chamber of the engine. In the system it is arranged such that said control means includes discriminating means for discriminating if the engine load is above a reference load when the acceleration state is detected and means for carrying out the retard adjustment when the engine load is above the reference load.

BRIEF EXPLANATION OF THE DRAWINGS

These and other objects and advantages of the invention will be more apparent from the following description and drawings, in which.

DETAILED DESCRIPTION OF PREFERRED EMBODIMENTS

The invention will now be explained with reference to specific embodiments.

Figure 1:
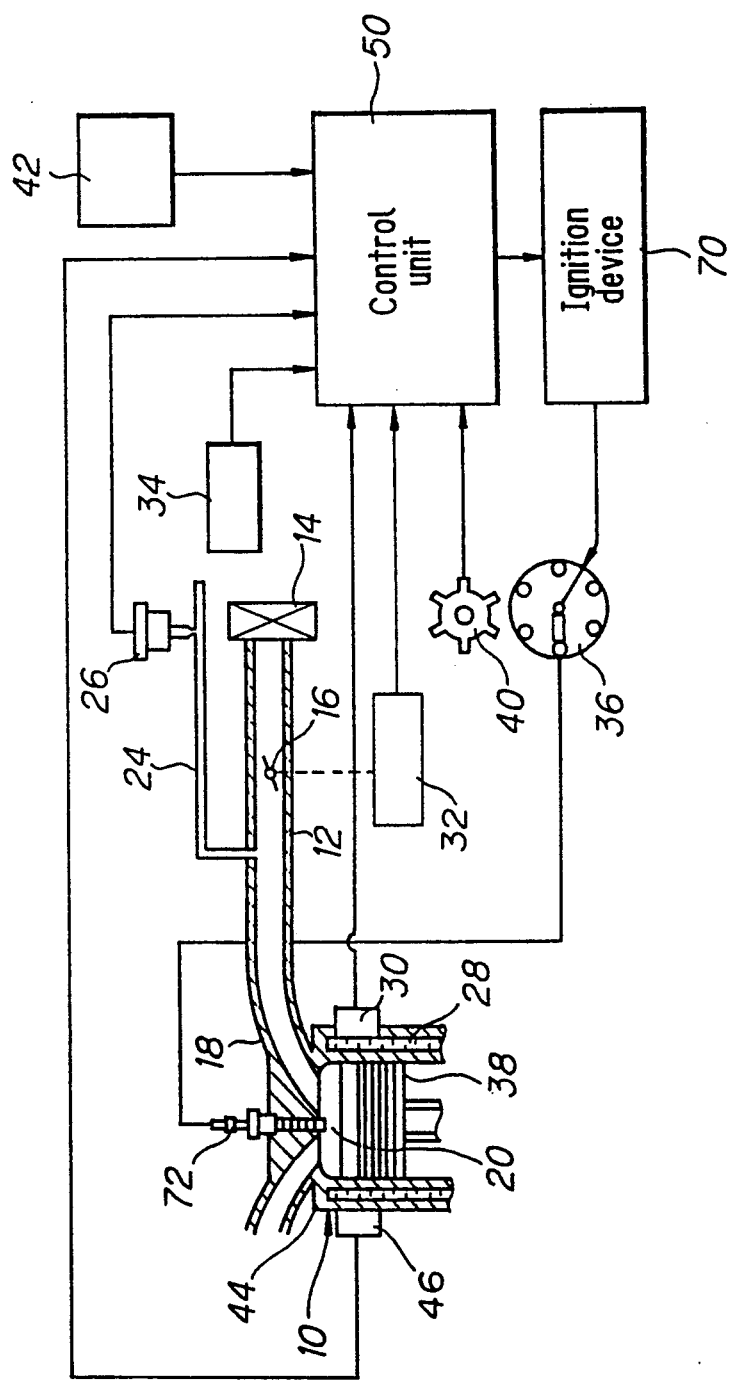
FIG. 1 is a schematic view of an ignition timing control system for vehicle internal control engines according to the present invention.

FIG. 1 shows the overall arrangement of an ignition timing control system for vehicle internal combustion engines in accordance with this invention. A six-cylinder vehicle internal combustion engine 10 has an air intake passage 12 provided at its distal end with an air cleaner 14. Air drawn in through the air cleaner 14 has its flow rate controlled by a throttle valve 16 and passes through a manifold 18 to combustion chambers 20 (only one shown). A pipe 24 branches off from the air intake passage 12 at an appropriate position downstream of the throttle valve 16. The pipe 24 is provided near its far end with an intake air pressure sensor 26 which detects the engine load by measuring the absolute value of the intake air pressure. A coolant temperature sensor 30 is provided in the vicinity of a coolant passage 28 of the internal combustion engine 10 for detecting the temperature of the engine coolant and a throttle position sensor 32 is provided in the air intake passage 12 at an appropriate position near the throttle valve 16 for detecting the degree of opening of the throttle valve 16. An atmospheric pressure sensor 34 is provided at an appropriate upstream position of the air intake passage 12 for detecting the atmospheric pressure of the location where the engine is being operated.

The internal combustion engine 10 has a distributor 36 which includes a crank angle sensor 40 comprised of a magnet which rotates in synchronism with a crankshaft (not shown) rotated by the reciprocal motion of pistons 38 (only one shown) and a stationary member disposed opposite the magnet. The crank angle sensor 40 outputs a pulse signal once every predetermined angle of crankshaft rotation. A vehicle speed sensor 42 for detecting the running speed of the vehicle equipped with the engine 10 is provided at an appropriate position on the vehicle. At an appropriate location on the block 44 of the internal combustion engine 10 is provided a piezoelectric knock sensor 46 for detecting vibration produced by combustion knock arising within the combustion chambers 20. The outputs of the intake air pressure sensor 26 and the other sensors 30, 32, 34, 40, 42 and 46 are forwarded to a control unit 50.

Figure 2:
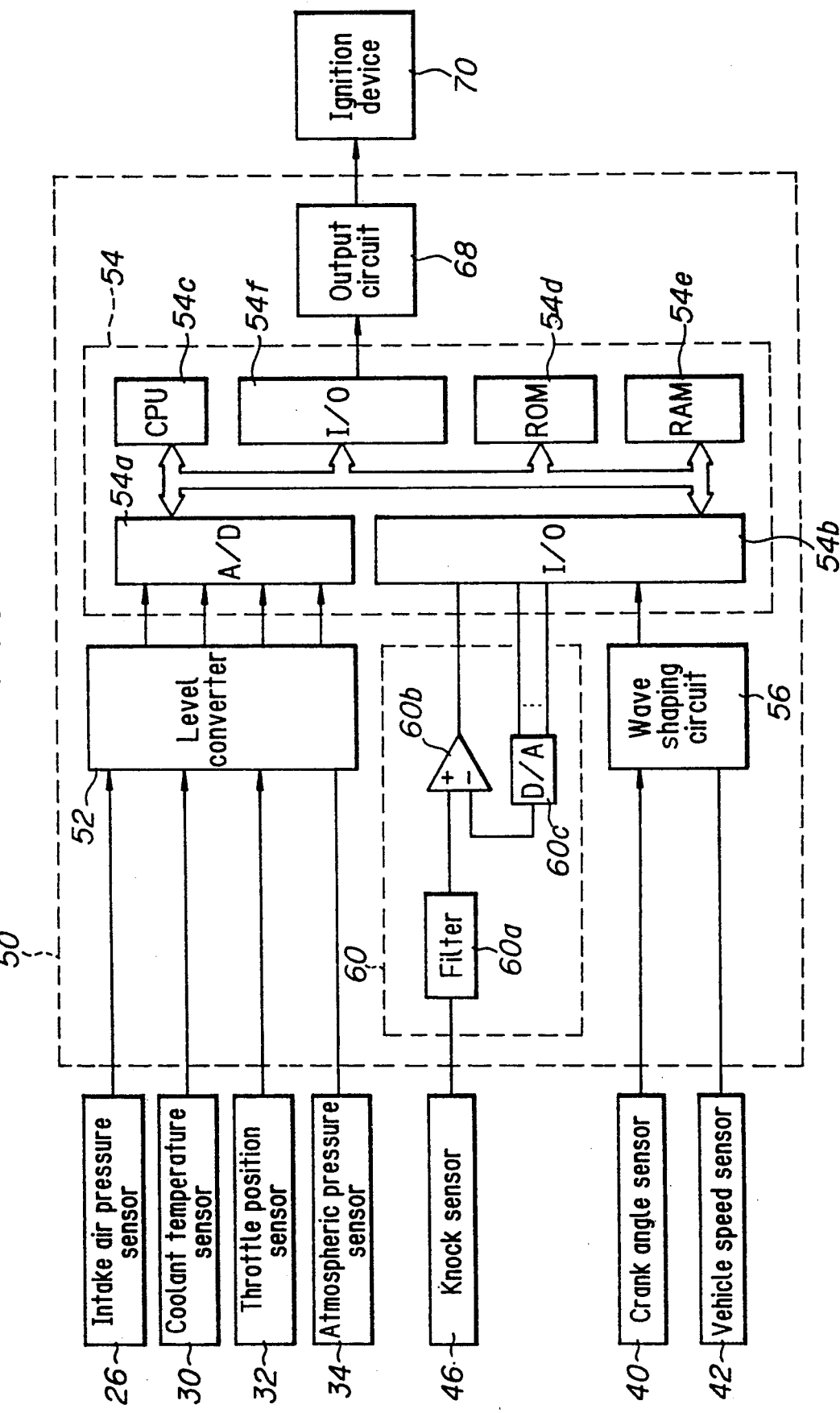
FIG. 2 is a block diagram showing the detailed arrangement of the control unit of the system of FIG. 1.

The arrangement of the control unit 60 is illustrated in FIG. 2. The analog outputs from the intake air pressure sensor 26 etc. are input to a level converter 52 in the control unit 50 for adjustment to a prescribed level and are then forwarded to a microcomputer 54. The microcomputer 54 comprises an A/D converter 54a, I/O circuits 54b, 54f, a CPU (central processing unit) 54c, a ROM (read-only memory) 54d, a RAM (random access memory) 54e, and counters for computation and timers (the two last mentioned members not being shown). The signals output by the level converter 52 are converted to digital values by the A/D converter 54a in accordance with commands from the CPU 54c and are then temporarily stored in the RAM 54e. The digital outputs of the crank angle sensor 40 etc. are shaped in a wave shaping circuit 56 and then input to the microcomputer 54 through an I/O circuit 54b.

After being sent to the control unit 50, the output from the knock sensor 46 is input to a knock detection circuit 60. The knock detection circuit 60 comprises a filter 60a, a comparator 60b and a D/A converter 60c. The occurrence of combustion knock is detected in the comparator 60b by comparing a reference value received from the microcomputer 54 through the D/A converter 60c with the sensor output value received through the filter 60a.

The microcomputer 54 calculates the engine speed from the output of the crank angle sensor 40, determines the engine load from the output of the pressure sensor 26, calculates a basic ignition timing, adjusts the basic ignition timing on the basis of the knock condition, further adjusts the so-obtained ignition timing during acceleration in the manner to be explained later so as to obtain the the I/O circuit 54f and an output circuit 68 to an ignition device 70, thereby causing a spark plug 72 of a prescribed cylinder selected by the distributor 36 to fire and ignite the air-fuel mixture in the associated combustion chamber 20.

The operation of the control system will now be explained with reference to the flowchart shown in FIG. 3. It should be noted that the present invention is not characterized by the ignition timing control itself but, as explained in the foregoing, by the retard adjustment conducted during acceleration. The following explanation will therefore focus on this point. The program according to the flowchart of FIG. 3 is executed by the microcomputer 54 on an interrupt basis at a predetermined crank angle.

Figure 3:
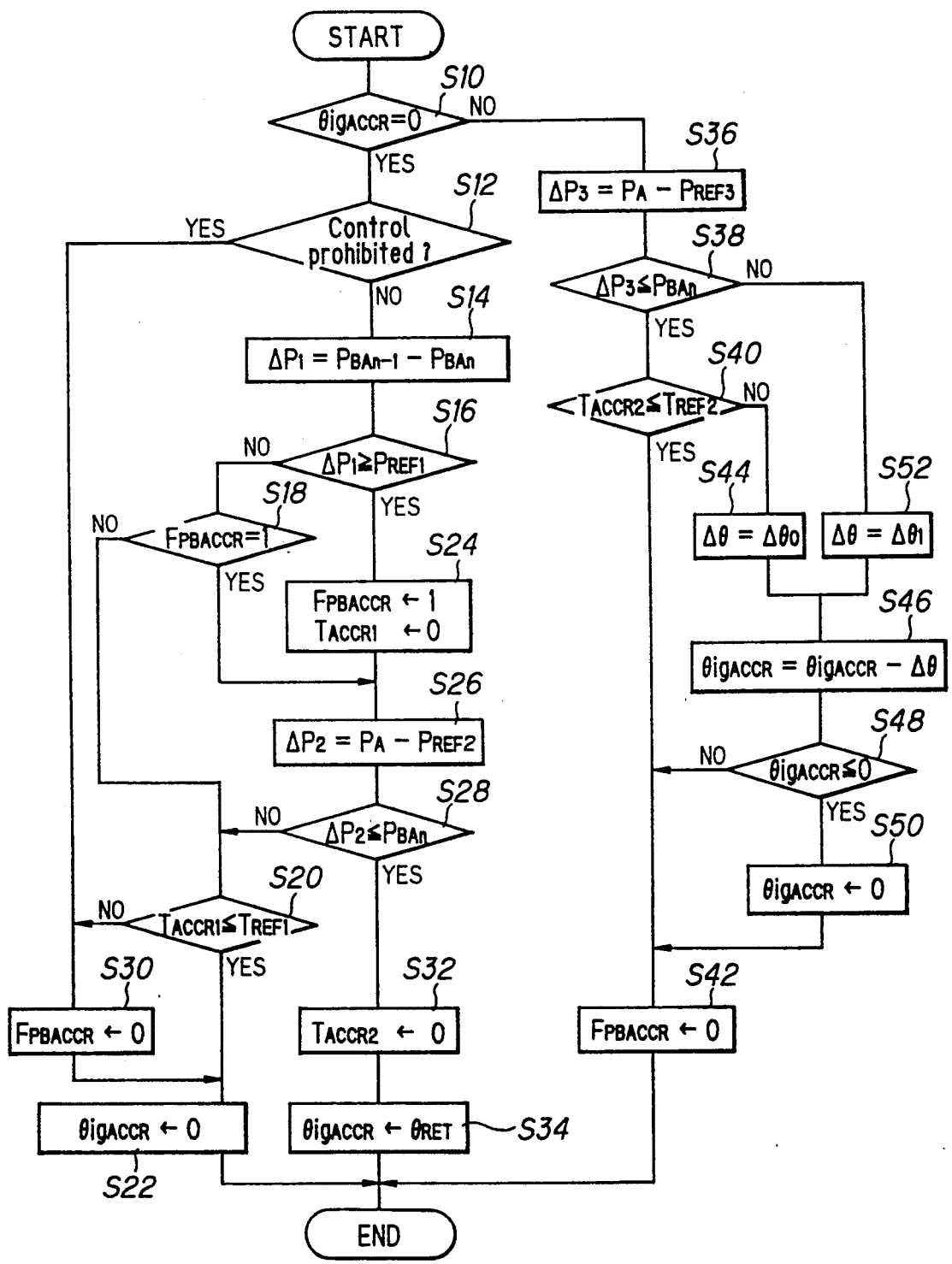
FIG. 3 is a flowchart showing a routine for operating the control unit.

Referring to FIG. 3, the procedure begins at step S10 in which it is determined whether or not an acceleration state retard adjustment value $\theta_{igACCR}$ (explained later) remains. As in the first program cycle this value is zero, the procedure moves to step S12 in which it is determined whether or not a condition prohibiting retard adjustment processing during acceleration has been established. Specifically, retard adjustment processing is prohibited under such conditions as when the engine speed is in a high speed region above a prescribed value or in a low speed region below a prescribed value, when the vehicle is traveling at greater than a prescribed speed, when the engine temperature is low, when the engine is being started and when failsafe control is in effect.

When it is found in step S12 that no prohibit condition is present, the procedure moves to step S14 in which the difference Delta $P_1$ between the air intake (manifold) pressure $P_{BAn-1}$ detected in the preceding cycle and the air intake pressure $P_{BAn}$ detected in the current cycle is calculated. Next, in step S16, the change in intake air pressure is compared with a reference pressure $P_{REF1}$ appropriately set at a value such as 21.5 mmHg. This comparison is conducted to determine from the change in intake air pressure whether or not acceleration is in progress.

When the change in air intake pressure is found to be smaller than the reference pressure in step S16, the procedure advances to step S18 in which it is determined whether or not the bit of a flag $F_{PBACCR}$ (explained later) is set to 1. In the first program cycle the result of this determination is normally negative and the procedure advances to step S20 in which the value of a timer $T_{ACCR1}$ (explained later) is compared with a reference time $T_{REF1}$ appropriately set at, for example, 2 seconds. The first time this step is executed, it is of course found that $T_{ACCR1}$ has not yet reached $T_{REF1}$ and the procedure advances to step S22 in which the retard adjustment value $\theta_{igACCR}$ is set to zero and the program is once terminated.

In the next and following program cycles, if it is found in step S16 that the change in intake air pressure exceeds the reference pressure, i.e. if it is determined that acceleration is in progress, the procedure advances to step S24 in which the bit of the aforesaid flag $F_{PBACCR}$ is set to 1 and the timer $T_{ACCR1}$ is started. The fact that the flag $F_{PBACCR}$ is on thus indicates that it was detected that acceleration is in progress.

The procedure then moves to step S26 in which a second reference pressure value $P_{REF2}$ (e.g. 200 mmHg) is subtracted from the detected atmospheric pressure $P_A$ to obtain a second difference Delta $P_2$ and then to step S28 in which the second difference Delta $P_2$ is compared with the intake air pressure $P_{BAn}$ detected in the current cycle. Where the vehicle is running on level ground, this difference becomes 560 mmHg and if it is determined in step S28 that the current air intake pressure has not reached this value, the procedure advances to step S20 in which it is determined whether or not the value of the timer $T_{ACCR1}$ has reached the reference time $T_{REF1}$ (2 sec.) and if it has not, the procedure moves to step S22 in which the retard adjustment value is still set to zero.

In the next and following program cycles, after determining in step S16 that acceleration is not in progress, the procedure goes to step S18 in which the flag $F_{PBACCR}$ is found to be on, to step S26 in which the second difference Delta $P_2$ is newly calculated, to step S28 in which the second difference Delta $P_2$ is again compared with the current air intake pressure $P_{BAn}$ and if the result in this step is negative, to step S20. If it is found in step S20 that the elapsed time is less that the prescribed value (2 sec.), the procedure goes to step S22 in which the retard adjustment value is set to zero. On the contrary, if it is found in step S20 that the elapsed time has reached the reference time, the procedure advances to step S30 in which the bit of the flag $F_{PBACCR}$ is reset to zero and the acceleration state adjustment is discontinued, and then to step S22 in which the retard adjustment value is set to zero and the program is terminated. In other words, even if the result of the detection is that acceleration is in progress, since this detection result can be assumed to be false if no increase is noted in the engine load over a relatively long period (2 sec.), the result of the detection finding acceleration to be in progress is canceled. The same also applies in the case where it is determined in step S12 that the aforesaid prohibit condition is present (S30, S22).

In the next and following cycles, if it is found in step S28 that the current intake air pressure $P_{BAn}$ is greater than the second difference Delta $P_2$ (560 mmHg on level ground), the procedure moves to step S32 in which a second timer $T_{ACCR2}$ is started and to step 34 in which the retard adjustment value $\theta_{igACCR}$ is set to a prescribed value $\theta_{RET}$ of appropriately selected magnitude (e.g. 8 degrees). Based on this value, the CPU 54c of the microcomputer 54 then retards the basic ignition timing by 8 degrees. If knock is detected, the ignition timing is further retarded. However, since the technique in which this is accomplished is well known and does not fall within the contemplation of this invention, it will not be explained here.

Therefore, in the next and following program cycles, it is found in step S10 that the retard adjustment value is not zero, the procedure moves to step 36 in which a third reference pressure $P_{REF3}$ (e.g. 100 mmHg) is subtracted from the detected atmospheric pressure $P_A$ to obtain a third difference Delta $P_3$, and to step S38 in which the detected intake air pressure $P_{BAn}$ is compared with the third difference Delta $P_3$ and if it is found that it also exceeds the third difference, the procedure moves to step S40 in which it is determined whether the value of the timer $T_{ACCR2}$ has reached a second reference time $T_{REF2}$ (e.g. 0.5 sec.). The first time this step is executed, the value of the timer has of course not yet reached the second reference time so that the procedure advances to step S42 wherein the bit of the flag $F_{PBACCR}$ is set to zero since it is no longer needed and the program is once terminated.

After a number of program cycles, when it is found in step S40 that the 0.5 sec. period has elapsed, the procedure advances to step S44 in which an advance unit amount Delta $\theta$ is set to Delta $\theta_0$ (e.g. 0.3 degree) and then to step S46 in which the unit value is subtracted from the retard adjustment value $\theta_{igACCR}$ to return the same in the advance direction, to step S48 in which it is determined whether or not the retard adjustment value $\theta_{igACCR}$ has returned to the initial zero value. If the result of this determination is negative, the procedure moves to step S42 and is once terminated. And in the next and following program cycles, so long as the determination in step S38 continues to be that a high load state (of, e.g., 660 mmHg on level ground) exists, the ignition timing is progressively advanced in increments of 0.3 degree through the procedures until it has been confirmed in step S48 that the retard adjustment value returned to zero. If confirmed so, the procedure advances to step S50, in which the retard adjustment value is forcibly set to zero such that no negative value could be generated in the reduction.

On the other hand if the determination in step S38 is that the rise in intake air pressure is relatively low, specifically if it is less than the third difference, the procedure moves to step S52 in which the advance unit amount Delta $\theta$ is set to a second value Delta $\theta_1$. The second value Delta $\theta_1$ is relatively large in comparison with the first value Delta $\theta_0$ and may, for example, be set at 2 degrees. The procedure then moves through steps S46–S50 and S42 in which, similarly to what was explained earlier, the ignition timing is returned toward its initial value by the second value Delta $\theta_1$.

Figure 4:
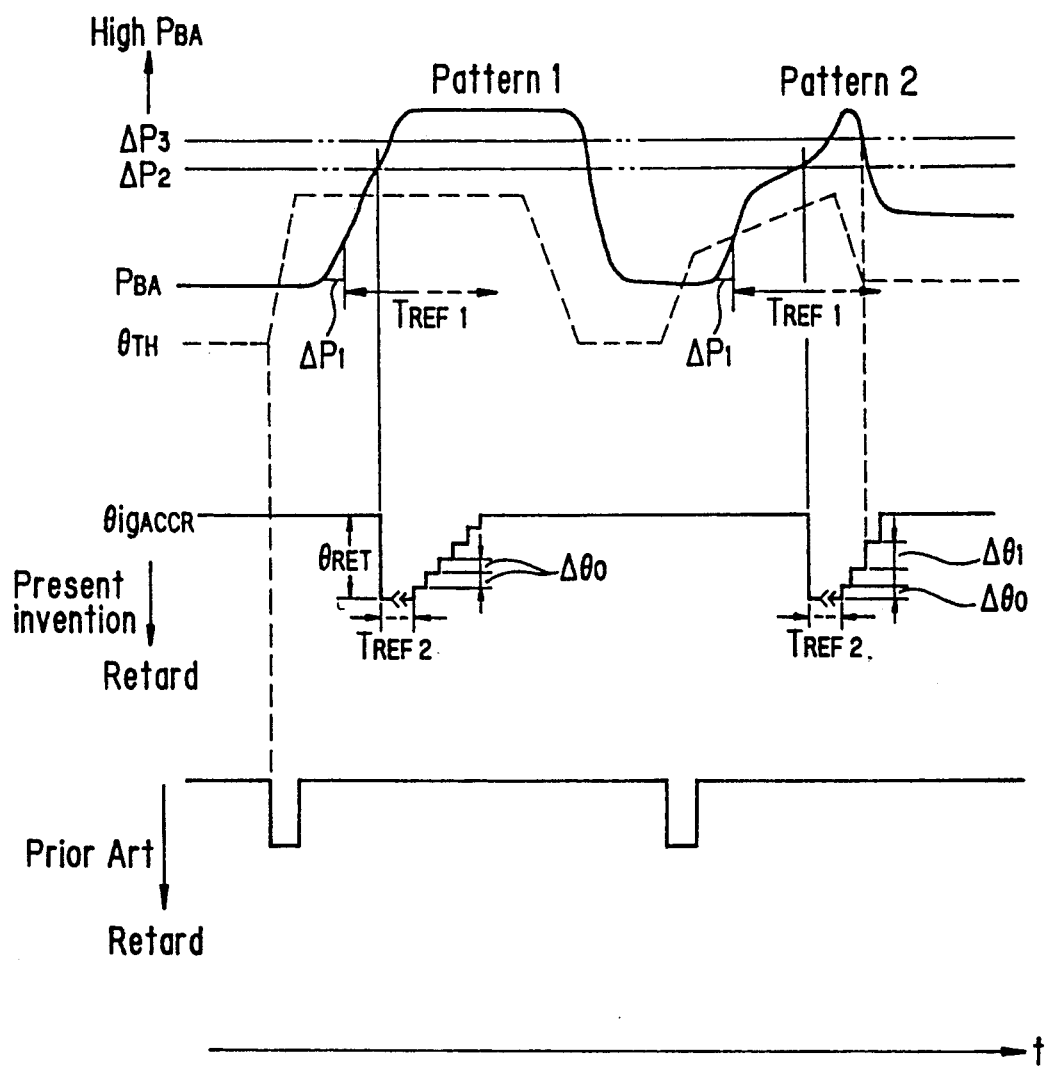
FIG. 4 is a timing chart for explaining the operation of the control unit.

The foregoing will now be explained with reference to the timing chart shown in FIG. 4. When the intake air pressure rises above the first reference pressure $P_{REF1}$ not shown in this figure, thus causing detection of acceleration, and then continues to rise after this detection until reaching the second difference value Delta $P_2$ within the period $T_{REF1}$, the ignition timing is at this time retarded immediately by 8 degrees, and, simultaneously, the measurement of elapsed time is again commenced. If the intake air pressure still continues to rise and comes to exceed the third difference value, the 8-degree retard amount is maintained for the second reference period $T_{REF2}$ (0.5 sec) and after passage of this 0.5 sec. period, the ignition timing is progressively adjusted in the advance direction by increments of Delta $\theta_0$. This is illustrated as Pattern 1 in the figure. On the other hand, when the rise in engine load is relatively small, adjustment for returning the ignition timing to its initial value is started immediately and the unit advance amount is switched to Delta $\theta_1$ for carrying out the return adjustment rapidly. Pattern 2 in the figure shows in the case where the engine load once rises over the third difference value but falls soon below the value in the course of the advancement so that the advance rate is switched to the fast rate at that point.

The reason for employing these two patterns is as follows. Where the engine load is high during acceleration, the probability of the occurrence of knock and the magnitude of the power shock likely to be produced are both large. In this case, therefore, the 8-degree retard adjustment is maintained for the prescribed period of time and the return to the initial ignition timing is conducted gradually using a relatively small advance unit amount. In contrast, where the engine load is relatively low, the probability of the occurrence of knock and the magnitude of the power shock likely to be produced are both proportionally smaller. In this case, therefore, the ignition timing is rapidly returned in the advance direction so as to avoid the degradation of combustion efficiency and the loss of engine power output that would otherwise be caused by the retard adjustment.

In the embodiment just described, the ignition timing is retarded only in the case where the actual engine load during acceleration rises above the second difference value. Thus, since the engine output torque is not returned at the early stage of acceleration, control response is improved by compensating for the air intake response lag. This is in contrast with the prior art shown in FIG. 4 in which the retard adjustment is carried out immediately when the change in the degree of throttle opening $\theta_{TH}$ illustrated by a dotted line exceeds an appropriately set reference value, notwithstanding the time phase lag between the throttle opening change and the engine load $P_{BA}$ as depicted in this figure. Moreover, since the ignition timing is retarded in the embodiment according to the present invention only after the engine output torque at acceleration has actually begun to increase, it becomes possible effectively prevent both knock and power shock during acceleration.

Moreover, at the time of returning the once retarded ignition timing in the advance direction, the rate of retard extinction (rate of advance) is varied depending on the load state so as to allow a relatively long period of time for returning the ignition timing to its initial value in the case of a persisting high load of not less than the third difference value. It is thus possible to, with continuous reference to the actual combustion state of the engine, prevent knock from occurring within the operating region concerned. In the case of a relatively low load of less than the value, on the other hand, the ignition is returned to its initial value in a relatively short period of time, whereby the reduction in engine output is minimized.

It should be noted here that, in step S16 in the flowchart, instead of detecting acceleration from variation in the manifold air pressure, it is possible to detect it from the rate of opening of the throttle valve. Further, while the acceleration state retard adjustment value referred in step S34 was set at 8 degrees irrespective of the state of engine operation, it can be made variable with the engine operating state. Similarly, the advance unit amount in steps S44 and S52 can also be varied with the state of engine operation. Furthermore, instead of making the determinations in steps S20, S40 on the basis of elapsed time, it is possible to count the number of cylinder firings and make these determination on the basis of the counted number of firings.

The present invention has thus been shown and described with reference to specific embodiments. However, it should be noted that the present invention is in no way limited to the details of the described arrangements but changes and modifications may be made without departing from the scope of the appended claims.

What is claimed is:

1. A system for controlling ignition timing of a vehicle internal combustion engine, including:
   first means for detecting engine speed and engine load;
   second means for detecting an acceleration state of the engine;
   control means for determining a basic ignition timing of the engine based on the detected engine speed and engine load and adjusting the basic ignition timing in the retard direction when the acceleration state is detected; and
   ignition means for igniting an air-fuel mixture in a combustion chamber of the engine;
   wherein the improvement comprises:
   said control means including;
   discriminating means for discriminating if the engine load is above a reference load when the acceleration state is detected; and
   means for carrying out the retard adjustment when the engine load is above the reference load.

2. A system according to claim 1, wherein after the retard adjustment was carried out, said control means adjusts the retarded ignition timing in the advance direction at a rate variable with the engine load.

3. A system according to claim 2, wherein said control means compares the detected engine load with a second reference load after the retard adjustment was carried out and adjusts the retarded ignition timing in the advance direction at a first rate if the detected engine load is above the second reference load or at a second rate greater than the first rate if the detected engine load is below the second reference load.

4. A system according to claim 3, wherein said control means includes measuring means for measuring time lapse after the retard adjustment was carried out and maintains the retard adjustment for a prescribed period if the detected engine load is above the second reference load.

5. A system according to claim 1, wherein said second means detects the acceleration state through change in the manifold pressure of the engine.

6. A system for controlling ignition timing of a vehicle internal combustion engine, including:
   first means for detecting engine speed and engine load of the engine;
   second means for detecting an accelerating state of the engine;
   control means for determining a basic ignition timing of the engine based on the detected engine speed and engine load and adjusting the basic ignition timing in the retard direction when the acceleration state is detected; and
   ignition means for igniting an air-fuel mixture in the engine;
   wherein improvement comprises:
   said control means including;
   measuring means for measuring time lapse after the acceleration state was detected;
   discriminating means for discriminating if the engine load has reached a reference load after the acceleration state was detected; and
   means for adjusting the basic ignition timing in the retard direction when the engine load has reached the reference load within a prescribed period after the acceleration state was detected.

7. A system according to claim 6, wherein after the retard adjustment was carried out the retard adjustment, said control means adjusts the retarded ignition timing in the advance direction at a rate variable with the engine load.

8. A system according to claim 7, wherein said control means compares the detected engine load with a second reference load after the retard adjustment was carried out and adjusts the retarded ignition timing in the advance direction at a first rate if the detected engine load is above the second reference load or at a second rate greater than the first rate if the detected engine load is below the second reference load.

9. A system according to claim 8, wherein said control means includes second measuring means for measuring time lapse after the retard adjustment was carried out and maintains the retard adjustment for a second prescribed period if the detected engine load is above the second reference load.

10. A system according to claim 6, wherein said second means determines the acceleration state through change in the manifold pressure of the engine.

* * * * *